United States Patent [19]

Veres

[11] Patent Number: 5,482,215

[45] Date of Patent: Jan. 9, 1996

[54] METHOD OF RECLAIMING RUBBER FROM VEHICLE TIRES

[75] Inventor: George Veres, City Beach, Australia

[73] Assignee: CMHT Technology (Australia) Pty Ltd, Osborne Park, Australia

[21] Appl. No.: 162,084

[22] PCT Filed: Jun. 12, 1992

[86] PCT No.: PCT/AU92/00282

§ 371 Date: Jan. 24, 1994

§ 102(e) Date: Jan. 24, 1994

[87] PCT Pub. No.: WO92/22409

PCT Pub. Date: Dec. 23, 1992

[30] Foreign Application Priority Data

Jun. 13, 1991 [AU] Australia .................. PK6674

[51] Int. Cl.⁶ ............................ B02C 19/00; B02C 19/12
[52] U.S. Cl. ................................ 241/1; 241/3; 241/14; 241/101.4; 241/DIG. 31
[58] Field of Search ................................ 241/1, 3, 14, 15, 241/24, 29, DIG. 31, DIG. 38, 101.4

[56] References Cited

U.S. PATENT DOCUMENTS

| 2,471,043 | 5/1949 | Schenck .................. 241/DIG. 31 X |
| 3,364,526 | 1/1968 | Várady et al. .................. 241/101.4 X |
| 3,693,894 | 9/1972 | Willette . |
| 3,843,061 | 10/1974 | Hammelmann .................. 241/38 |
| 4,090,670 | 5/1978 | Bennett .................. 241/DIG. 31 X |
| 4,363,450 | 12/1982 | Schmidt .................. 241/101.4 X |
| 4,840,316 | 6/1989 | Barclay .................. 241/DIG. 31 X |
| 4,863,106 | 9/1989 | Perkel . |
| 5,024,386 | 6/1991 | Morris .................. 241/101.4 X |
| 5,115,983 | 5/1992 | Rutherford, Sr. .................. 241/DIG. 31 X |
| 5,147,163 | 9/1992 | Booker et al. .................. 241/DIG. 31 X |

FOREIGN PATENT DOCUMENTS

| 508588 | 10/1976 | Australia . |
| 15374/88 | 5/1990 | Australia . |
| 83210/87 | 5/1990 | Australia . |
| 838722 | 3/1939 | France . |
| 2903431 | 8/1980 | Germany . |
| 3048504 | 7/1982 | Germany . |
| 3217149 | 12/1983 | Germany . |
| 58-076248 | 7/1983 | Japan . |
| 59192548 | 3/1985 | Japan . |
| 213339 | 5/1968 | U.S.S.R. . |
| 260874 | 1/1970 | U.S.S.R. . |
| 379302 | 8/1932 | United Kingdom . |
| WO-A-9215438 | 9/1992 | WIPO . |

Primary Examiner—Timothy V. Eley
Attorney, Agent, or Firm—Baker & Daniels

[57] ABSTRACT

A method of reclaiming rubber from vehicle tyres that enables the high grade rubber in the tread portion of the tire to be collected separate from the lower grade rubber in the sidewalls and other areas of the tire. The method comprising separating the complete tread portion from the remainder of the tire and then removing from that tread portion the high grade tread rubber. Thereafter the remainder of the tread portion and the sidewall and bead portion of the tire are each treated to separate the rubber from metallic and fabric reinforcement materials therein. The high quality tread rubber and lower grade other rubber are both removed in a particulate form.

6 Claims, 5 Drawing Sheets

METHOD OF RECLAIMING RUBBER FROM VEHICLE TIRES

BACKGROUND OF THE INVENTION

This invention relates to a method of reclaiming rubber from vehicle tires so that the rubber can be recycled in various forms and for many purposes.

The increasing vehicle population of the world presents an increasing enviromental problem in relation to the disposal of used vehicle tires. Currently there are large stockpiles of used tires throughout the world as there was not as yet been developed a method of disposal of the tires which is considered both environmentally acceptable and economic.

Burying of tires in landfill has been used as a method of disposal, however, in view of the size, construction and flexibility of tires, they result in initially forming cavities in the landfill and are difficult to effectively compact during the landfill operation. Further, it has been found that in these situations the soil tends to settle more than the tires and the latter may subsequently resurface. Further the practice of burning of tires as a fuel also presents a problem in the nature of the resulting products of combustion and the relatively low thermal output. Also there is the problem of tires incorporating non combustible components such as steel reinforcing wires or mesh which present difficulties in the operation of combustion equipment.

There have been a number of proposals for stripping the rubber material from the metal or fabric reinforcement, however, most prior proposals have not proven to be economically viable. In order to maximise the financial return from the reclaiming of materials from vehicle tires, it is desirable to be able to separate substantially all of the rubber content of the tires from the metal reinforcement therein, and to further separate the relatively high quality rubber in the tread portion of the tire from the lower quality rubber in the sidewalls, bead area of the tire.

Various processes and machinery for the reclaiming of rubber from tires have been disclosed in the following U.S. Pat. Nos.

4,113,18—SMITH
4,216,916—TUPPER
4,726,530—MILLER
4,802,635—BARCLAY
4,840,316—BARCLAY
4,863,106—PERKEL:

SUMMARY OF THE INVENTION

It is the object of the present invention to provide a method of reclaiming rubber from vehicle tires which enables the maximum rate of recovery of rubber to be achieved in an economic manner while also enabling the higher grade tread rubber to be separated from other rubbers recovered from the tire.

With this object in view, there is provided according to the present invention, a method of reclaiming rubber from vehicle tires, comprising:

separating the tread portion of the tire from the respective sidewalls to provide an elongate tread strip incorporating a tread reinforcement belt;
removing the tread rubber in a particulate form from the tread reinforcement belt;
independently removing the remaining rubber in a particulate form; from the tread reinforcement belt; and
reducing the sidewall to a particulate form.

Preferably the rubber of the sidewalls is also reduced to a particulate form and also the rubber incorporated in the tire beads. Where fabric reinforcement materials are used in the sidewalls and/or the beads, that non-metallic material is particulised with the rubber. Conveniently, if desired, the reinforcement material can be separated from the rubber subsequent to the breakdown thereto to the particulate form, conveniently by a process dependent on the differences in specific gravity of the respective materials.

The initial separation of the tread portion from the remainder of the tire is effected by making peripheral cuts through each sidewall in the area of the junction thereof with the tread portion. These cuts may be effected mechanically such as by rotary knives or saws or by high pressure liquid jets, commonly referred to as ultra high pressure liquid (UHPL) cutting. Preferably the separated tread portion has one or more cuts across the width of the tread portion, through the total thickness thereof to form one or more strips.

The tread strip is then fed in a flat state past a rotary cutter set to remove the tread rubber from the reinforcement belt. Preferably the rotary cutter cuts across the full width of the tread strip so that all of the tread rubber is removed in a single pass.

The remainder of the tread strip, after the removal of the tread rubber, is subject to UHPL cutting to remove the remaining rubber, including the rubber normally provided on the inner side of the tread reinforcement of the tire. This UHPL cutting is performed in a manner to remove the rubber in a particulate form, such as by using a plurality of jets moving in a predetermined cyclic path selected to produce particles in the required size range. Preferably the rubber is removed from the inner side of the tread reinforcement by applying the jets to the inner side in preference to form the tread side through the reinforcement In tires having a metal reinforcement belt in the tread portion, it is possible to operate the UHPL cutting so that the metal reinforcement is not broken up and mixed with the rubber. However, when fabric reinforcement is used, it will normally be particulated with the rubber and when required can be subsequently separated. There are some uses for this rubber where the presence of the particulated reinforcement is not detrimental or can be advantageous.

The individual sidewalls, with the bead still attached as produced by the tread portion removal operation, can also be subjected to UHPL cutting to particulate the rubber and fabric reinforcement leaving the bare bead wires. The bead wires being of high tensile steel, can be recycled economically.

The above described process enables relatively high production rates to be achieved as each of the four stages of the breaking down on the tire can be carried out at the same time in a continuous process, namely:

(1) Separation of tread portion from side walls
(2) Particulating of the tread rubber of the tread strip
(3) Particulating of the remainder of the rubber in the tread strip
(4) Particulating of the sidewalls.

Following the separation of the tread portion from the sidewall and bead portions of the tire, the removal of the respective rubber components of the tread portion of the tire can be carried out at the same time as the removal of the rubber from the sidewalls is also in progress. Further, as the separation of the tread portion from the sidewalls is independent to the removal of the tread rubber from the tread portion of the tire, these operations can also be carried out at the same time on respective tires. Thus the throughput of tires is solely governed by the time required by the slower of the above four referred to steps and, by appropriate design of the respective elements of the machinery, high production rates can be achieved.

Also it is envisaged that step (1) the separation of the tread portion from the sidewalls and beads, can be carried out separately in both location and or time from the remaining steps. This substantially reduces the space occupied in storing the tire prior to further processing. The separation operation, step (1), can be carried out on a mobile unit that collects the used tires from service stations and other tire sales outlets where replacement tires are fitted.

BRIEF DESCRIPTION OF THE DRAWINGS

The invention will now be described in more detail in respect of one practical arrangement thereof as illustrated in the accompanying drawings.

In the drawings.

DETAILED DESCRIPTION OF THE INVENTION

Figure 1:
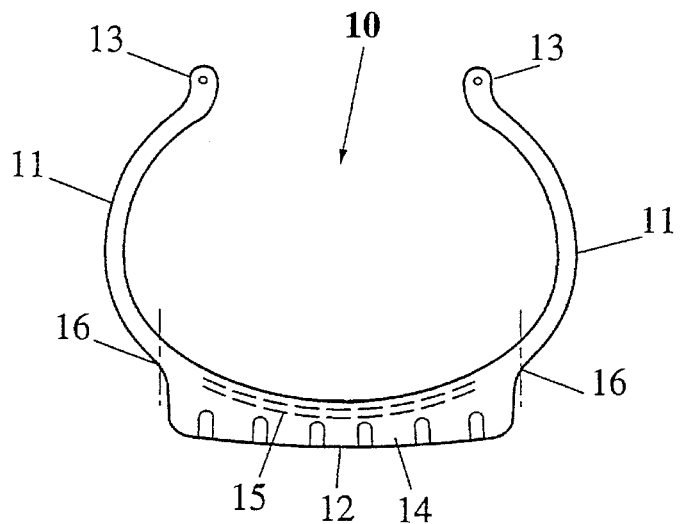
FIG. 1 is a diagrammatic representation of a cross section of a typical vehicle tire.

Referring now to FIG. 1 the vehicle tire 10 has a tread portion 12 sidewalls 11 and beads 13. Conventionally the bead 13 includes a rigid ring made of a number of coils of steel wire. The tread portion 12 comprises a reinforcement belt 15 normally composed of a woven fabric or metal fibres with a relatively thick outer layer of high quality tread rubber 14. The sidewalls and the inner part of the tread portion being formed of a lower quality rubber with a fabric reinforcement therein.

Figure 2A:
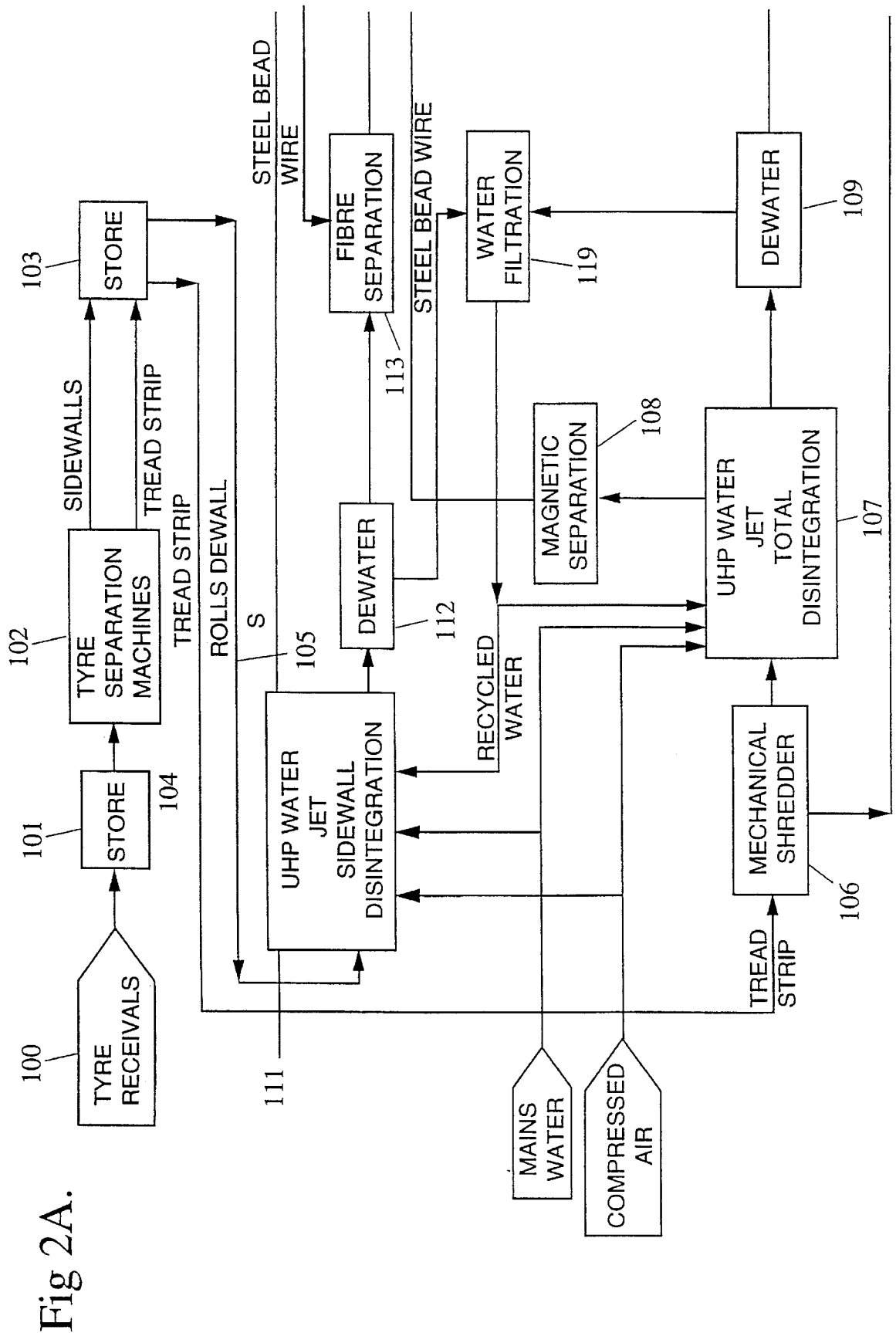
FIGS. 2A and 2B together is a flow chart for the recovery of rubber and other materials from tires.
Figure 2B:
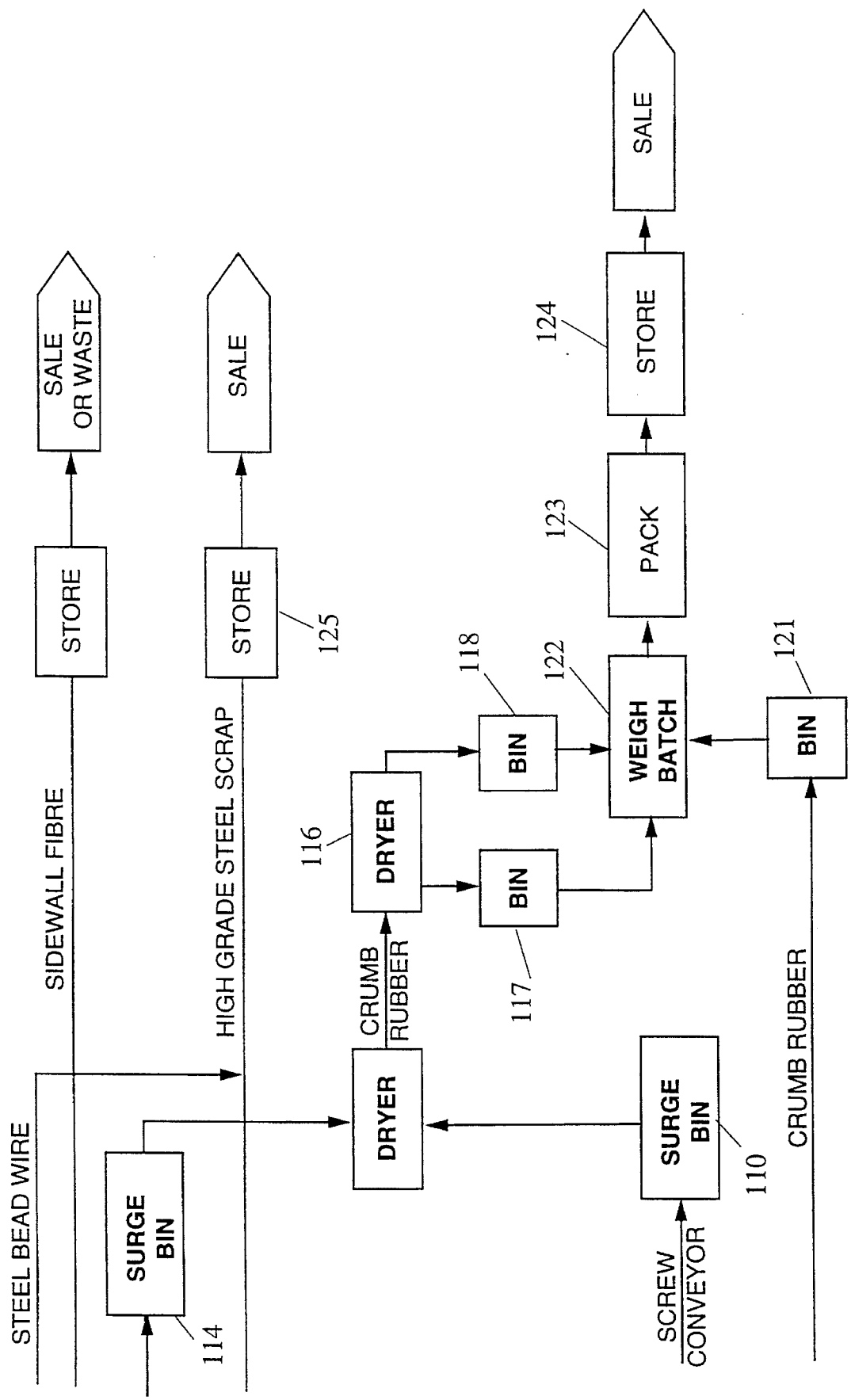

FIGS. 2A and 2B is a flow chart of the complete recycling process for vehicle tires in which the proposed removal separation and collection of different quality rubbers is incorporated.

Tires are collected from a range of sources at a central receival facility 100 and placed into a store 101. After receival the tires may be sorted in accordance with size, rubber quality, remaining tread thickness or other characteristics that can influence the extent and nature of subsequent processing.

The tires pass from the store 101 to the first processing operation 102 wherein the tread portion 12 of the tire is separated from the two sidewall 11 and integral beads 13. The tread portion and sidewall-bead portions are stored separately at store 103 for subsequent independent treatment. The respective portions of the tire may also be stored separately in accordance with quality and or size considerations. From the store 103 the tread portion and sidewall-bead portion travel separate paths 104, 105 respectively to the mechanical tread rubber shredder 106 and sidewall disintegrator 111.

The tread portion 12 is fed in strip form through the mechanical shredder 106, so the high quality tread rubber located outwardly of the reinforcement belt is removed. This can be effected by a rotary cutter or grinder, as hereinafter further described, which produces rubber particles of a selected size. As the tread rubber particles are removed independent of other components of the tire, such as reinforcement materials, and without addition of other materials such as water, the tread rubber particles can be immediately passed to storage bin 121.

Subject to the nature of further use and sale of the reclaimed tread rubber it can conveniently be withdrawn from the bin in batch lots weighed at 122, packaged at 123 and stored at 124 for subsequent sale. As will be referred to hereinafter, other reclaimed tire materials can also be weighed, packaged and stored at 122, 123 and 124 by the latter being selectively operably coupled to storage bins 117 and 118.

After the high quality tread rubber has been removed by the shredder 106 the tread portion strip is passed through UHPL disintegrator 107 where it is subjected to ultra high pressure water jets that break the strip down to particulate form. The resulting particle mix of rubber and steel wire from the tread belt is subjected to a magnetic separator 108 to remove the steel wire from the rubber, the steel wire being passed to a steel scrap store 125 for subsequent sale.

The rubber particle material passes from UHP disintegrator 107 to a dewatering station 109 from which the water is recycled to the UHP disintegrator and the rubber particle material passed via a surge bin 110 to a dryer 115. After drying the rubber particle material is then passed through sizing screens 116 and rubber particles within selected size ranges are directed to respective storage bins 117 and 118. Subject to the extent of size variation in the rubber particle material produced, and market demands, the rubber particle material can be graded into more than two sizes. The graded rubber particles can be weighed packed and stored at 122, 123, and 124 as previously referred to.

The individual sidewall and bead sections are passed from the store 103 to the further UHPL disintegrator 111 wherein they are subjected to ultra high pressure water jets that breakup the sidewalls into particular material of rubber and fibre, and also removes the rubber and fibre material from the bead, also in particulate form. The mixture of rubber and fibre material passes from the UHP disintegrator 111 to the dewatering station 112 from which the separated water is passed through the filter 119 and then recycled to the UHPL water supply. The rubber and fibre particle material is passed to the separator 113 which can be of a flotation or cyclonic type, whereafter the fibre is passed to store 126, and the rubber particle material passes to the surge bin 114.

As the nature of the respective materials held in the surge bin 110 and surge bin 114 are substantially the same they are each processed together or sequenually through the same equipment down stream of the respective surge bin 110, 114. Thus material from surge bin 114 is dried by the dryer 115, graded by the screen 116, and subsequently weighed, packed and stored as previously described in relation to material from surge bin 110.

It will be seen from the above description of the proposed recycling process that there is recovered in a usuable form substantially the whole material content of the tire in an integrated process. The high grade tread rubber is completely separated from the other materials of the tire, the lower grade rubber in the sidewalls and tread are each recovered separated from the respective reinforcement materials, and the fibre and steel of reinforcement materials are individually recovered.

As each of these components of a tire are usuable for differing purposes or in differing products, the maximum financial return is obtainable by processing used tires by the process above described.

Further details of one practical construction and arrangement of specific machines used in carrying out the proposed process will now be described.

Figure 3:
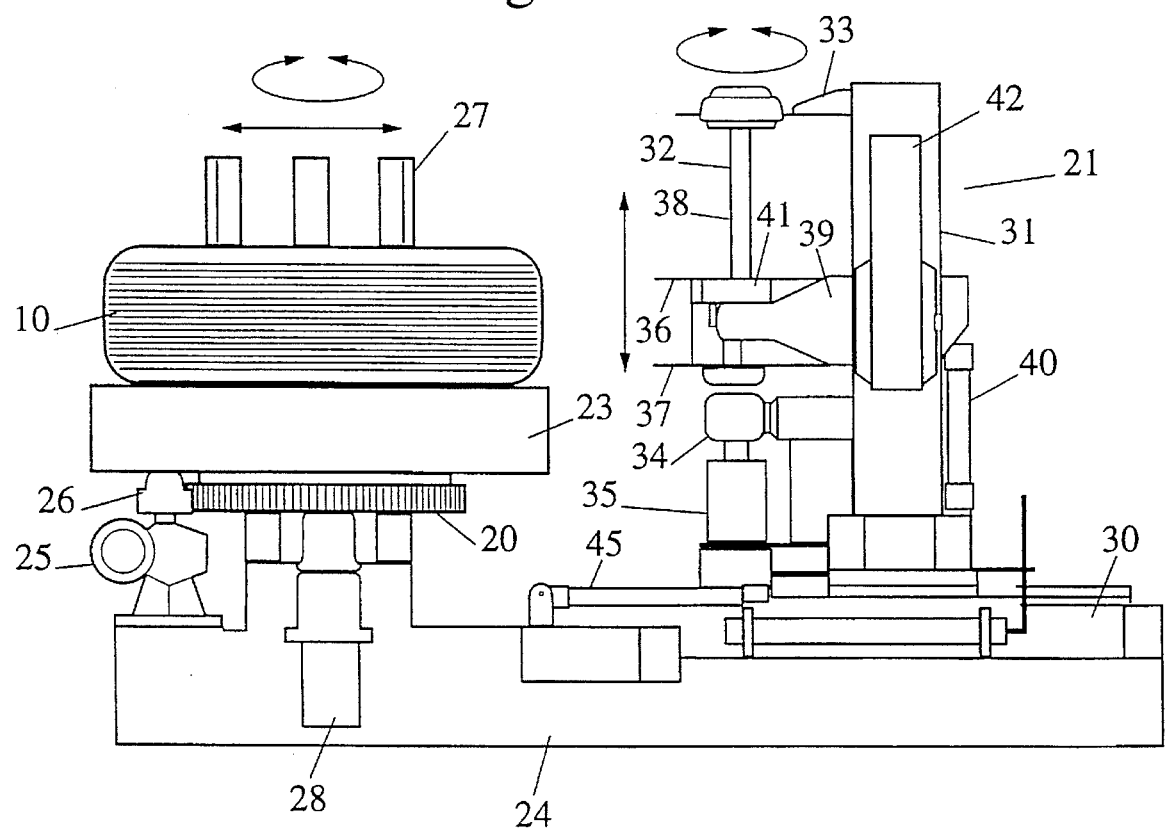
FIG. 3 is a side view of the mechanism for initially segmenting the tire.

Referring to FIG. 3 there is shown in basic form a mechanism for initially separating the tire into three sections, a tread portion and two sidewall-bead portions, comprising a tire chuck assembly 20 and a cutter assembly 21. The chuck assembly comprise a tire platform 23 mounted upon the base frame 24 to rotate about a vertical axis and driven by the motor 25 through the reduction gear train 26. Mounted on the tire platform 23 are four chuck fingers 27 equally spaced about the axis of the tire platform 23 to pass through a tire 10 positioned on the platform.

The four fingers 27 are each mounted to be radially slidable in unison with respect to the tire platform 23 in order to accommodate a range of tire sizes, and to permit a tire to be received freely over the fingers and then gripped thereby by moving the fingers radially outward in unison. The radial movement of the fingers 27 is effected by the hydraulic motor 28 to retract and expand the finger as required during loading, driving and unloading of the tires from the chuck assembly.

The cutter assembly 21 comprises a base frame 30 with a cutter column assembly 31 mounted thereon for linear movement relative thereto toward and away from the tyre chuck assembly 20. The vertical cutter drive shaft 32 is rotatable supported at the upper and lower ends by bearing arms 33 and 34 projecting from the column 31. The drive shaft 32 is coupled to the motor 35.

The lower saw blade 37 is mounted in a fixed location on the drive shaft 32. The position of the saw blade 37 is selected so the blade is at a level to cut a tire mounted on the tire platform 23 of the chuck assembly in the area of the junction between the tire tread portion and lower sidewall as indicated at 16 in FIG. 1. The upper saw blade 36 is mounted on the splined upper portion 38 of the drive shaft 32 so it can be adjusted to the level of the junction of the tire tread portion and the upper sidewall of the tire on the chuck platform 23. The arm 39 is vertically slidable in the track 42 provided on the column 31 under the control of the hydraulic cylinder 40. The arm 39 carries the support 41 for the upper saw blade 36 whereby by operation of the hydraulic cylinder 40 the upper saw blade 36 can be positioned relative to the lower saw blade 37 to suit different width tires.

The complete cutter column assembly 31 is slidably mounted on the base frame 30 and movable relative thereto under the control of the hydraulic cylinder 45 in order to move the saw blades 36 and 37 into and out of operational engagement with a tire mounted on the chuck platform 23. When the saw blades are so engaged with the tire, and the tire is rotating, the two sidewalls and beads will be each separated from the tread portion of the tire. Upon release of the fingers 27 of the chuck assembly 20 the three sections of tire, namely the tread portion and two sidewall and bead portions, can be removed from the chuck assembly for subsequent individual processing. The tread portion 12 of the tire as removed from the chuck platform 23 is in the form of an annulus and is subsequently guillotined or otherwise cut across the face of the tread portion so it may be either flattened or rolled for economic storage. If the tread portion is to be stored flat it is preferred to cut it into two or three sections.

It is to be understood that the above described separation of the tread portion from the sidewalls may be effected at a location remote from the area where the tread portion and sidewalls are further processed. This initial separation assists in the economic transportation of the tire to the processing plant, as the space occupied by separated components of the tire is substantially less than that occupied by the tire when in one piece.

Suitable equipment to separate the tread portion from the sidewalls may be mounted on a trailer or vehicle so that the initial sectioning of the tire is carried out as part of the collection operation and would enable the tread portion to be rolled or stacked flat and the sidewalls stacked flat for subsequent transportation and/or storage before further processing.

Figure 4:
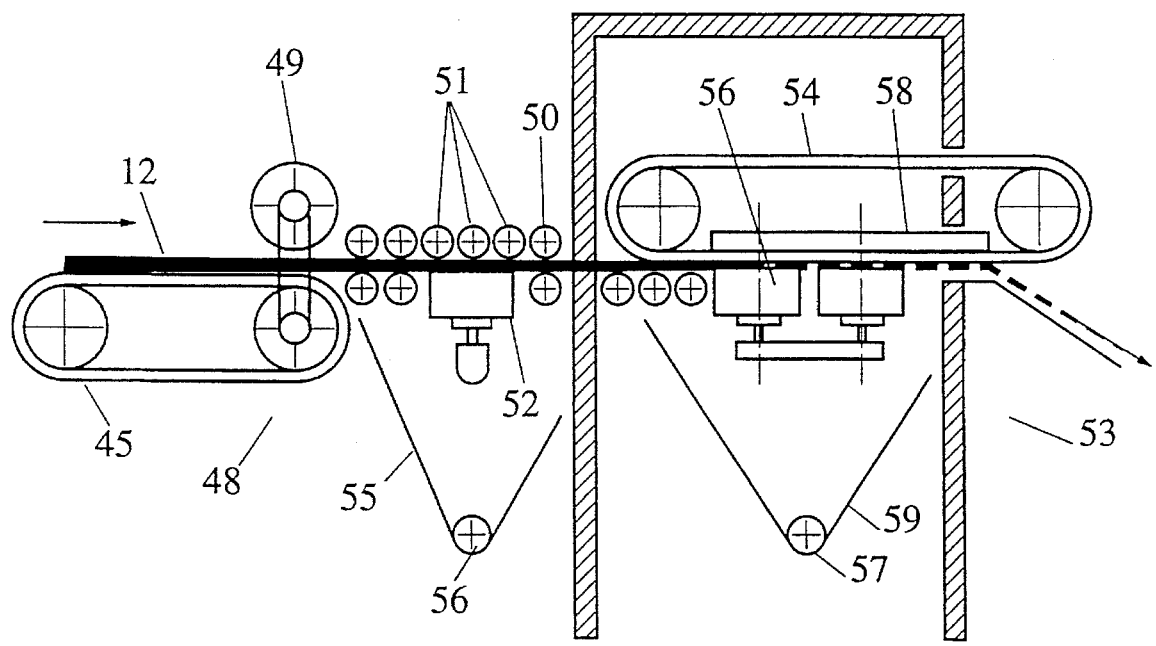
FIG. 4 is a side view of the mechanism for recovery of rubber from the remaining portion of the tread.

Referring again to FIG. 4, the tread rubber removal assembly 48 comprises conveyor 45 and feed rollers 49, which receive the previously separated tread portion 12, and withdrawal rollers 50 which feed the remainder of the tread portion, after the removal of the tread rubber, to the UHP treatment apparatus 53.

The tread rubber removal assembly 48 further includes back-up rollers 51 and a rotary cutting 52, the latter having an appropriate cutting tooth formation on the upper surface thereof, and is driven at a speed relative to the feed rate of the tread portion to remove the tread rubber in an appropriate particle size. The position of the cutter 52 with respect to the back-up roller 51 is adjusted in accordance with sensed measurements of the tread portion, particularly the thickness thereof, so that the cutter 52 only removes that portion of the tread rubber below the level of the reinforcement belt in the tread portion of the tire. This tread rubber being of a higher quality than the remainder of the tire and is required to be kept separate therefrom. The high grade tread rubber is collected in the hopper 55 and withdrawn therefrom by the screw conveyor 56 and delivered to bin 121 (FIG. 2B).

The remainder of the tread portion of the tire is then passed into the UHPL apparatus 53 by the conveyor 54 wherein two revolving heads 56, each with an array of high pressure nozzles impinge jets of water onto the remainder of the tread portion to cut the rubber therein into small particles and strip it from reinforcement belt, which is normally, of a metal filaments construction. In order to separate the metal filaments, released as the rubber is removed by the UHP apparatus 53, from the rubber a magnet structure 58 is provided adjacent the lower flight of the conveyor on the side thereof opposite the tread portion. The magnet structure is constructed to provide a magnetic field of sufficient strength to hold the metal filaments in contact with the conveyor and thereby separate the filaments from the rubber particles created by the UHPL jets. The influence of the magnetic field created by the magnet structure extends a short distance beyond the area where the tread rubber particles are collected in the hopper 59 so that beyond the magnetic influence the metal reinforcement belt fibres are discharged onto conveyor 54. The rubber removed by the UHPL apparatus in particle form is collected in the hopper 59 and removed therefrom by the screw conveyor 57 with the water from the UHP apparatus being separated from the rubber particles.

It will be appreciated that provision is made for the appropriate collection of the tread rubber removed by the cutter 52 independently of the rubber removed by the UHPL device, so the higher value tread rubber can be recycled separately. Also the metal belt fibres can be recycled.

Figure 5:
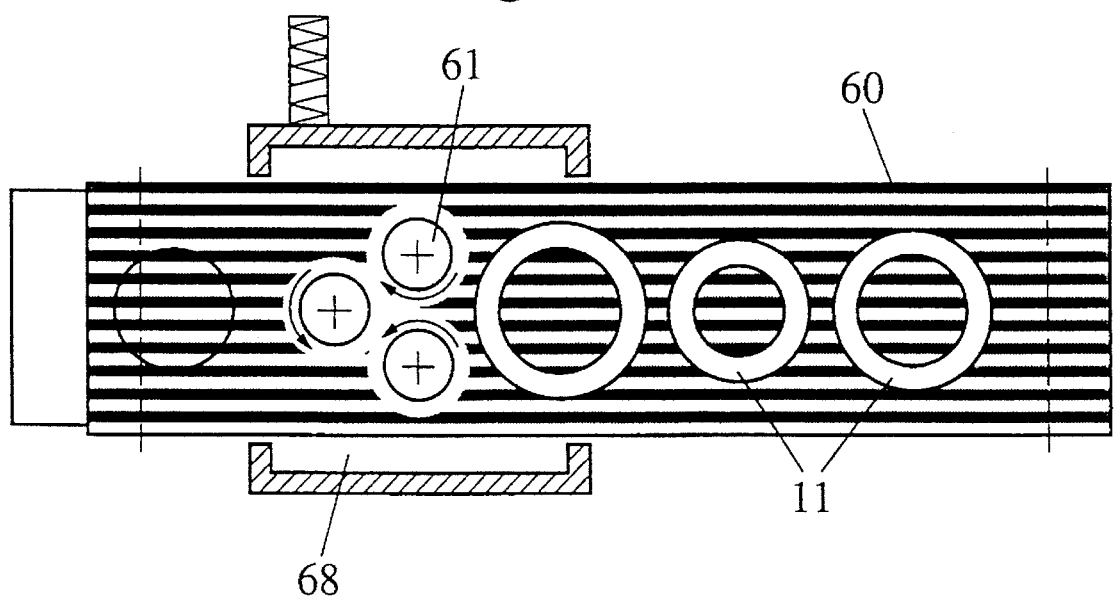
FIG. 5 is a plan view of the mechanism for recovery of rubber from the sidewalls.
Figure 6:
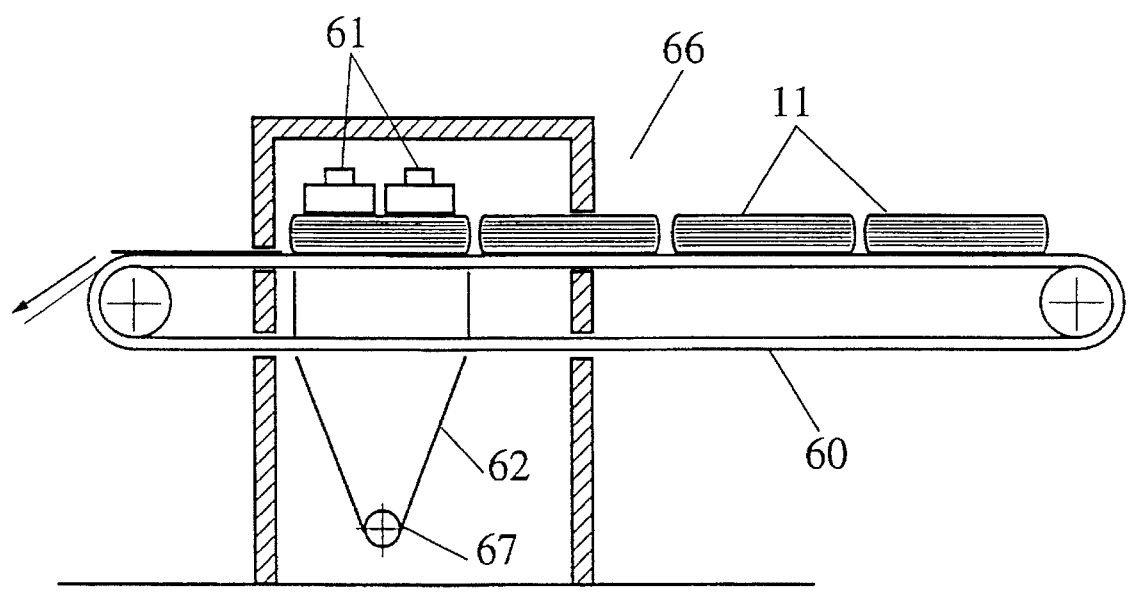
FIG. 6 is a side view of the mechanism shown in FIG. 5.

The sidewalls with the beads integral therewith are processed independently as indicated in FIG. 2A by equipment as will now be described with reference to FIGS. 5 and 6 of the accompanying drawings.

The sidewall and bead sections 11 are deposited on the conveyer 60 and passed sequentially beneath a series of three UHPL devices 61 positioned and operated to break up the rubber and fibre reinforcement of the sidewall and to remove rubber from the bead portion 13.

The sidewall and bead portion 11 of the tire as removed from the tread portion, is loaded onto the conveyor 60 in a row formation and are advanced through the treatment area 66, wherein three UHPL devices 61 are arranged to operate simultaneously in breaking up the wall portion of the tire passing therethrough, and release the rubber attached to the bead wires.

The three UPHL devices are arranged so the full width of the side wall and bead portion is subjected to the action of the jets of the UPH devices in a single pass. If desired the relative location of the UHPL devices may be adjusted for accommodating sidewall portions of differing diameters. It has been found that a small number, up to about four, of individual sidewall and bead portions can be stacked one on the other and subjected to the UHPL treatment in that stacked arrangement.

It is to be appreciated that although the UHPL jets have a highly effective cutting action, they apply only minimum forces to the sidewall and bead portions and thus it is not required to hold down or otherwise secure the sidewall portions to the conveyor 60.

The rubber and fabric particle created in the breaking up of the sidewalls is collected in the hopper 62 from which it is passed by screw conveyor 67 to the dewater treaatment and then separation of the rubber from the fabric as referred to with respect to FIGS. 2A and 2B. The steel wire of the bead is passed directly to storage or may be chopped to small lengths, or baked prior to storage.

The equipment above described herin with reference to FIGS. 3 to 6 is intended to be only the currently best known equipment for carrying out the method claimed in this Application. It is to be understood that other equipment may be used in the practice of the invention. Also the individual processing of the respective sections of the tire are not necessarily carried out at the same time or at the same location.

The UHPL cutting equipment as rererred in the description of the practical implementation of the present invention is not described herein in detail as the basic principles of operation of such equipment is well known and can be readily applied to provide cutting equipment suitable for use in carrying out the present invention.

I claim:

1. A method of reclaiming rubber from a vehicle tire incorporating an annular tread portion having a metallic reinforcement belt underlying a layer of tread rubber, and respective sidewalls, said method comprising:

separating the tread portion from the respective sidewalls and forming a tread portion strip;

treating said tread portion strip to remove the layer of tread rubber from the reinforcement belt in a particle form;

separately treating the tread portion strip to remove the remaining rubber from the reinforcement belt in a particle form, and separately treating the sidewalls to reduce the sidewalls to a particle form, the steps of treating the tread strip portion to remove the remaining rubber and the treating of the sidewalls each being performed independently of the step of removal of the tread rubber and each by the use of ultra high pressure liquid jets.

2. A method as claimed in claim 1, wherein the material of the reinforcement belt is separately collected as the tread portion strip is treated to remove said remaining rubber from the tread portion strip.

3. A method as claimed in claim 2, wherein the particulate sidewall material is treated to separate the rubber particles from sidewall fibre reinforcement particles.

4. A method as claimed in claim 2, wherein the separated tread portion of the tire is cut transversely to form two or more tread portion sections and each said section is treated to remove the tread rubber therefrom.

5. A method as claimed in claim 1, wherein the particulate sidewall material is treated to separate the rubber particles from sidewall fibre reinforcement particles.

6. A method as claimed in claim 1, wherein the separated tread portion of the tire is cut transversely to form two or more tread portion sections and each said section is treated to remove the tread rubber therefrom.

* * * * *